United States Patent [19]

Fukui et al.

[11] Patent Number: 5,040,650
[45] Date of Patent: Aug. 20, 1991

[54] POWER TRANSMISSION

[75] Inventors: Tetsu Fukui; Yoshimi Oota, both of Osaka, Japan

[73] Assignee: Kubota, Ltd., Japan

[21] Appl. No.: 483,134

[22] Filed: Feb. 22, 1990

[30] Foreign Application Priority Data

Mar. 15, 1989 [JP] Japan ................................. 1-64701

[51] Int. Cl.⁵ ............................................. B60K 41/26
[52] U.S. Cl. ................................... 192/4 R; 192/8 R; 188/134
[58] Field of Search ........................... 192/7, 8 R, 4 R; 188/134

[56] References Cited

U.S. PATENT DOCUMENTS

| 2,891,767 | 6/1959 | Armington, Jr. | 188/134 |
| 3,219,154 | 11/1965 | Schenck et al. | 192/7 |
| 3,367,456 | 2/1968 | Bohnhoff | 192/7 |
| 3,433,332 | 3/1969 | Braun | 192/7 |
| 3,536,169 | 10/1970 | Arnold | 188/134 X |
| 3,870,129 | 3/1975 | Arnold | 188/134 |
| 4,030,578 | 6/1977 | Cacciola et al. | 188/134 |
| 4,176,733 | 12/1979 | Twickler | 192/8 R X |
| 4,346,793 | 8/1982 | Fuse et al. | 188/134 |
| 4,483,429 | 11/1984 | Tiedeman | 192/8 R |
| 4,487,085 | 12/1984 | Collins | 74/113 |
| 4,579,201 | 4/1986 | Tiedeman | 188/134 X |
| 4,597,477 | 7/1986 | Miller | 188/134 X |
| 4,693,349 | 9/1987 | Tysver | 188/134 X |

FOREIGN PATENT DOCUMENTS

| 1216625 | 5/1966 | Fed. Rep. of Germany . |
| 869859 | 6/1961 | United Kingdom . |
| 2218788 | 9/1974 | France . |
| 315200 | 5/1989 | European Pat. Off. . |

Primary Examiner—Allan D. Herrmann
Assistant Examiner—Andrea Pitts
Attorney, Agent, or Firm—Webb, Burden, Ziesenheim & Webb

[57] ABSTRACT

A power transmission comprising a drive shaft and a driven shaft connected to each other to be relatively rotatable within a predetermined range. The connection between the two shafts includes a cam member axially slidable on the driven shaft. The driven shaft carries a brake device interlocked with the cam member. When an accelerating force is transmitted from ground wheels to the driven shaft, the cam member slides axially of the driven shaft. This sliding movement causes the brake device to brake the driven shaft.

8 Claims, 4 Drawing Sheets

POWER TRANSMISSION

TECHNICAL FIELD

The present invention relates to power transmissions, and more particularly to a power transmission for a vehicle which prevents the vehicle from being accelerated by gravity when traveling down an inclined terrain.

BACKGROUND OF THE INVENTION

Conventionally, when an agricultural tractor, a passenger vehicle or the like is running, the wheels and engine are interconnected through a reduction system. When the vehicle travels down an inclined terrain, the engine brake is operable to suppress acceleration of the vehicle by gravity.

FIG. 5 shows a commonly known transmission for a vehicle. This transmission comprises a propelling line for transmitting power from an engine 1 to a running device 3 through a hydraulic clutch 31 and a first transmission gearing 32, and a propelling line for transmitting power from the engine 1 to the running device 3 through a second transmission gearing 33, a one-way clutch 34 and a transmission shaft 35. With this transmission, when the hydraulic clutch 31 is disengaged, the power is changed into a plurality of speeds by the second transmission gearing 33 and transmitted to the running device 3 through the transmission shaft 35. When the hydraulic clutch 31 is engaged, the power is changed into a plurality of speeds by the first transmission gearing 32 for transmission to the running device 3. The first transmission gearing 32 provides higher rotational rates than the second transmission gearing 33. The one-way clutch 34 is mounted in the transmission to enable the different rotational rates. When, for example, the vehicle travels down an inclined terrain with the hydraulic clutch 31 disengaged, an accelerating force due to gravity is transmitted through the running device 3 to the transmission shaft 35. With this transmission, however, the one-way clutch 34, which is constructed to allow the higher rotational rates than those transmitted from the second transmission gearing 33, will allow the transmission shaft 35 to be accelerated by such a force. As a result, the vehicle will be accelerated without limitation. Thus, there is room for improvement from the safety point of view.

Among the transmissions being developed recently is one shown in U.S. Pat. No. 4,487,085, which steplessly changes the speed of power with a combination of a cam, a roller, a one-way clutch and the like. As disclosed in the above patent, the one-way clutch is connected in series to a propelling line. Such a transmission, as does the transmission shown in FIG. 5, has room for improvement from the safety point of view since the vehicle will be accelerated while traveling down an inclined terrain.

It is conceivable to provide a transmission mechanism comprising a worm gear between the transmission and running device to prevent acceleration of the running device. However, a transmission having such a worm gear not only entails a substantial power loss during a normal run, but results in enlargement of the transmission per se. This construction too has room for improvement.

It is to be noted that, in a transmission having a worm gear, the worm gear is meshed with a wheel gear, and use is made of the feature that the wheel gear is rotatable by rotation of the worm gear but not vice versa.

SUMMARY OF THE INVENTION

An object of the present invention is to provide an improved and compact transmission which transmits power without any power loss during a normal run such as when the vehicle runs on a level terrain, and easily restricts acceleration due to an external cause such as a vehicle weight or gravity.

The above object is achieved, according to the present invention, by a power transmission comprising a first shaft acting substantially as a drive shaft; a second shaft acting substantially as a driven shaft; a connection provided between the first and second shafts, the connection including connecting means for interconnecting the first and second shafts in a way to allow a relative rotational displacement therebetween, and displacing means displaceable with the rotational displacement occurring between the first and second shafts; and brake means for braking the second shaft in response to the displacement of the displacing means. Preferably, the displacing means is axially displaceable.

The transmission as constructed above has the following function and effect, assuming that this transmission is used in a conventional vehicle drive system as shown in FIG. 5. When the vehicle travels on a level terrain, the first and second shafts maintain a predetermined relative phase relation (that is, no rotational displacement occurs between the first and second shafts). Consequently, power is transmitted from the first shaft to the second shaft without power loss, with the displacing means remaining fixed. When an accelerating force is applied from the running device, i.e. ground wheels, to the second shaft, the first and second shafts move out of the predetermined relative phase relation (that is, a rotational displacement or deviation occurs between the first and second shafts). This results in a displacement of the displacing means, whereby the brake means applies a braking force to the second shaft to suppress acceleration thereof.

With this power transmission, when an accelerative rotational force is continuously applied to the second shaft as when the vehicle travels down an inclined terrain, the above braking action decelerates the second shaft and adjacent components. Then the power applied from the first shaft returns the first and second shafts to the original rotational phase within a short time. When the second shaft begins accelerating again, the braking force is applied again. In this way, the braking force is applied intermittently, thereby realizing a smooth braking effect.

Thus, the present invention provides a compact transmission which transmits power without any power loss during a normal run, and easily and smoothly restricts acceleration due to an external cause.

Other features and advantages of the present invention will be apparent from the following description.

BRIEF DESCRIPTION OF THE DRAWINGS

The drawings show transmissions according to the present invention, in which.

DESCRIPTION OF THE PREFERRED EMBODIMENTS

An embodiment of the present invention will be described with reference to the drawings.

Figure 1:
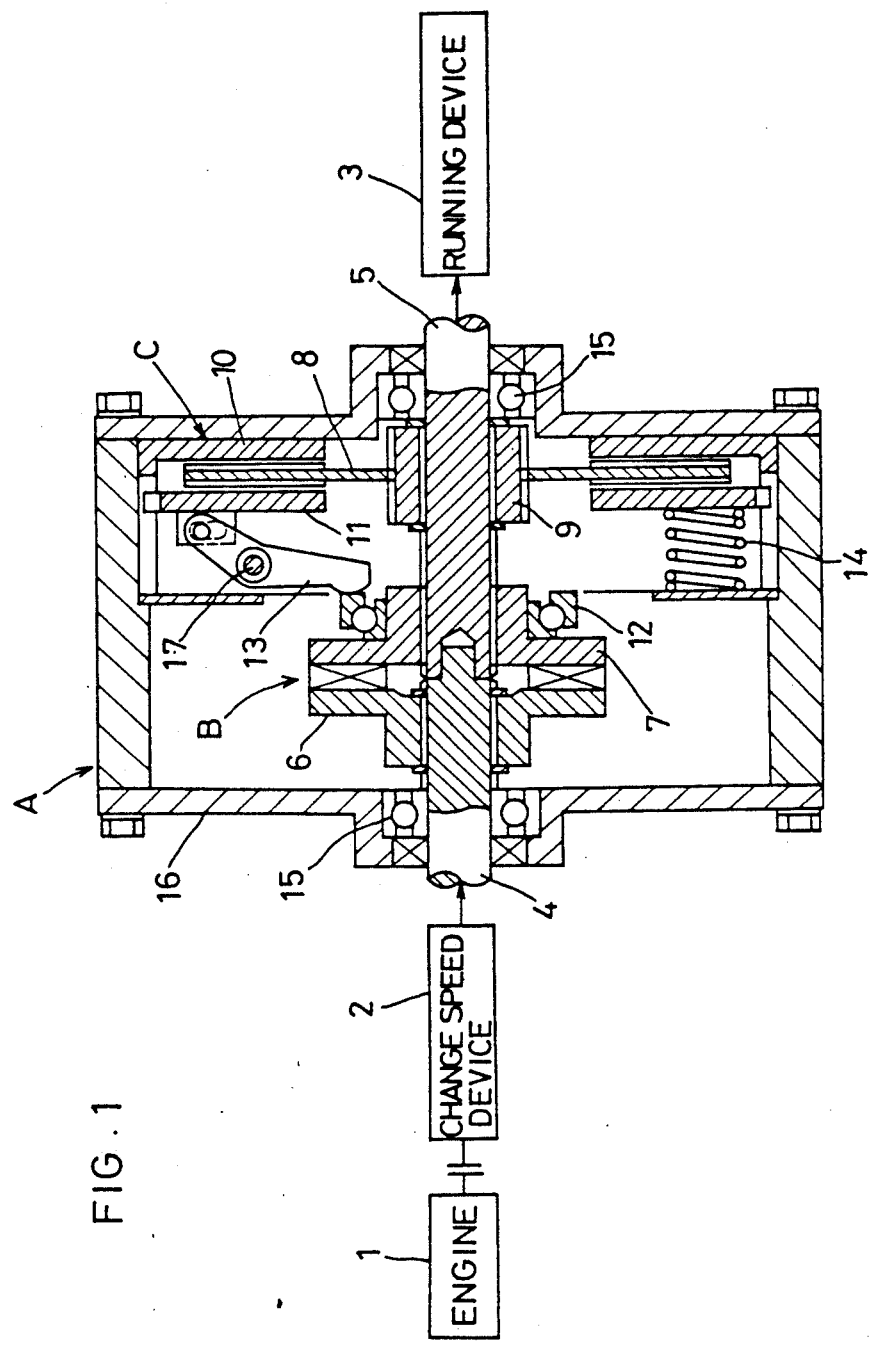
FIG. 1 is a sectional view of a transmission.

As shown in FIG. 1, a propelling transmission system of a vehicle comprises a change speed device 2 and a transmission A for transmitting power from an engine 1 to a running device 3 including ground wheels.

The change speed device 2 is constructed to allow its output portion to rotate when a higher rotational rate than an output rotational rate is transmitted to the output portion. Acceleration of the vehicle is suppressed by the transmission A shown in FIG. 1.

Figure 2:
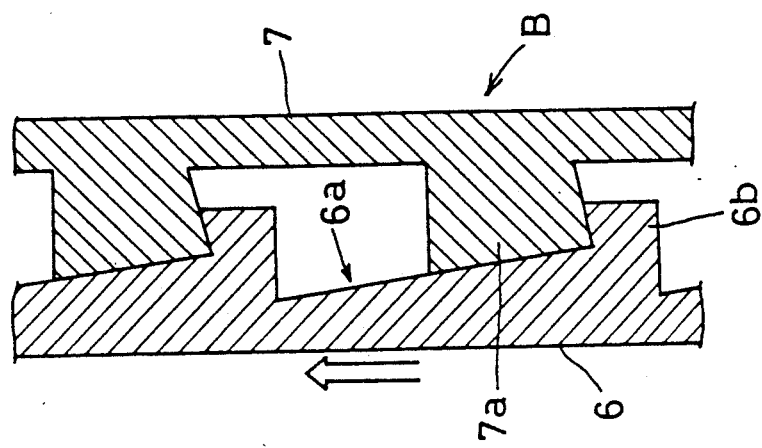
FIG. 2 is a sectional view showing the shape of a cam mechanism.

Referring to FIGS. 1 and 2, the transmission A includes a first shaft 4 for receiving the power from the change speed device 2, and a second shaft 5 for transmitting the power to the running device 3. The first and second shafts 4 and 5 are coupled to each other through a connection B which allows variations in rotational phase within a predetermined range between the two shafts 4 and 5. This connection B includes a drive cam 6 splined to the first shaft 4, and a driven cam 7 splined to the second shaft 5. As shown in FIG. 2, the drive cam 6 defines a recess 6a and a stopper 6b continuous with the recess 6a. The driven cam 7 defines a projection 7a which is allowed to move circumferentially (in directions of rotation) only within a region in which the projection 7a contacts the stopper 6b. This movement causes the driven cam 7 to slide axially of the first and second shafts 4 and 5.

The second shaft 5 carries a brake disk 8 splined thereto through a holder 9. The brake disk 8 is sandwiched between a friction plate 10 and a pressure plate 11. The pressure plate 11 is interlocked with the driven cam 7 through a release bearing 12 and a lever type control arm 13 having a transmission amplifying function, so that the axial sliding movement of the driven cam 7 moves the pressure plate 11 between a pressurizing position and a release position. Further, braking springs 14 are provided to apply a force to the pressure plate 11.

The above is an outline of the transmission A. The brake disk 8, friction plate 10, pressure plate 11 and so on constitute a brake device C.

The first and second shafts 4 and 5 are supported by a casing 16 of the transmission A through bearings 15. The friction plate 10 is supported directly by the casing 16. The control arm 13 is supported by the casing 16 through a support shaft 17.

When a force is applied from the running device 3 to the second shaft 5 to cause an overrun of the latter, the driven cam 7 will slide closer to the drive cam 6. As a result, the brake device C applies a braking force resembling an engine brake to the second shaft 5.

Figure 4:
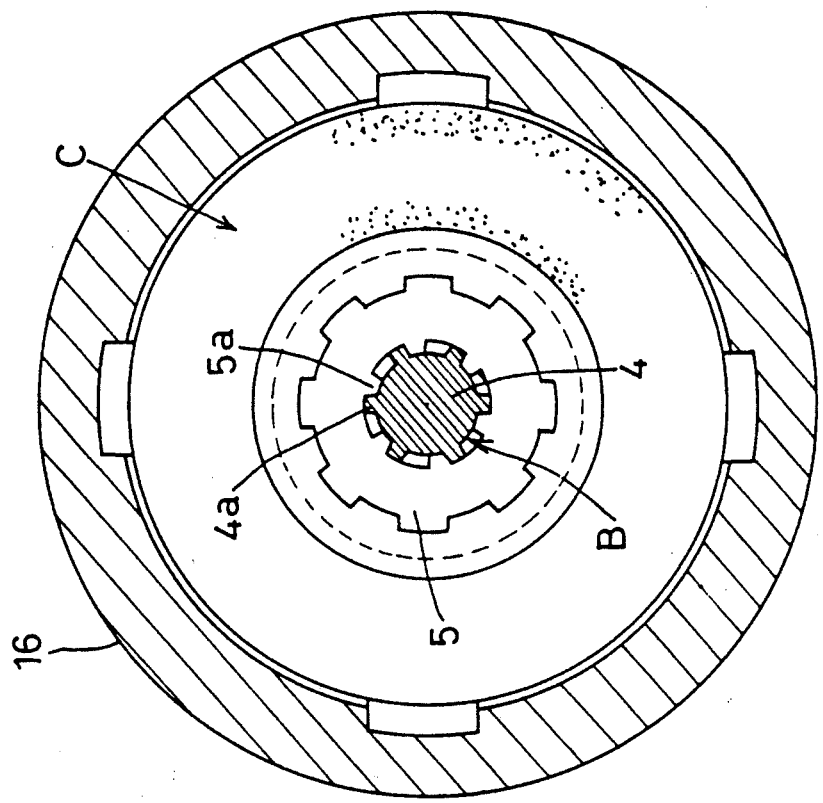
FIG. 4 is a section taken on line IV—IV of FIG. 3.
Figure 3:
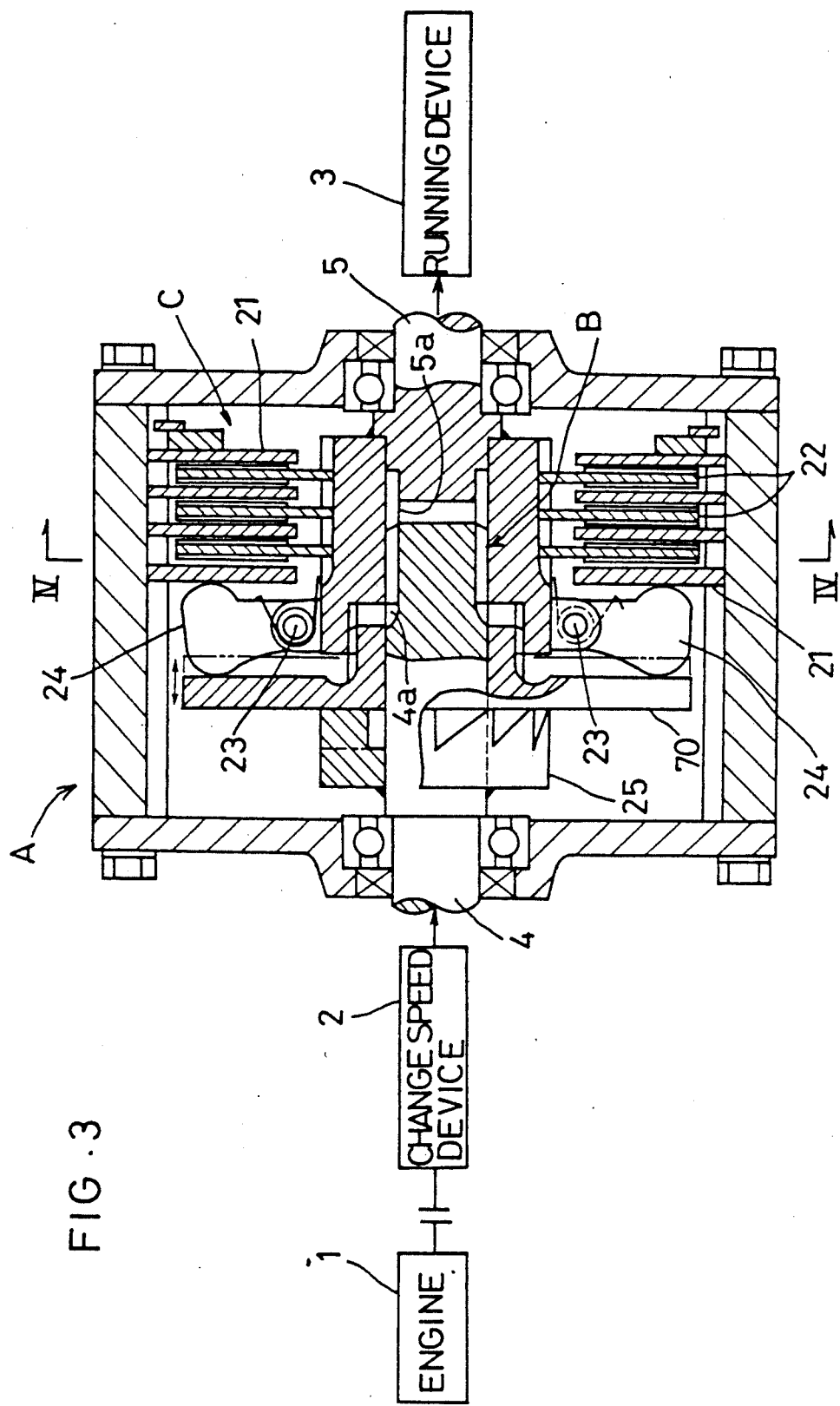
FIG. 3 is a sectional view of a transmission in a different embodiment of the invention.
Figure 5:
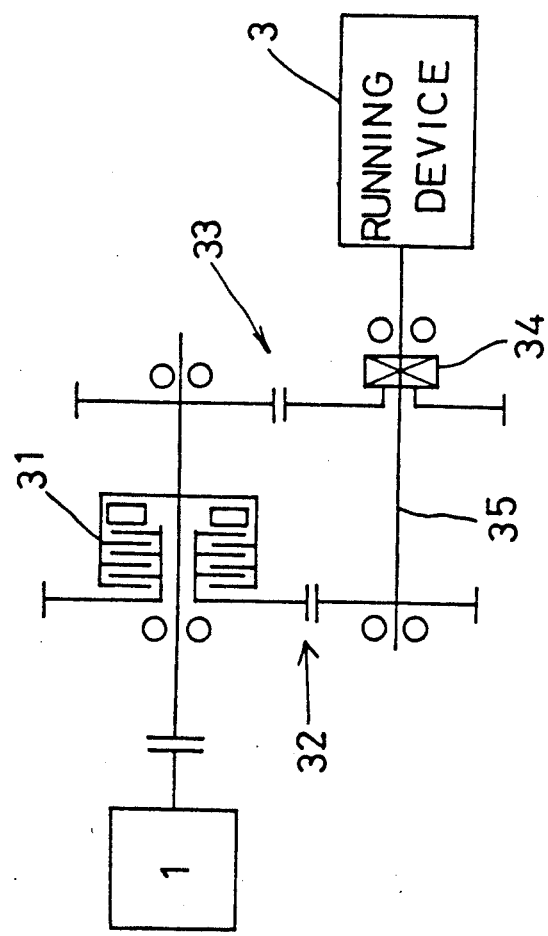
FIG. 5 is a schematic view of a conventional transmission.

FIGS. 3 and 4 show another embodiment of the present invention, which differs from the foregoing embodiment in the way in which a displacement of a cam 70 is transmitted to a brake device. The brake device of this embodiment comprises a plurality of disks.

In this embodiment, a connection B is formed by splines 4a and 5a of the first and second shafts 4 and 5, respectively, with some freedom of movement allowed therebetween. The brake device C includes friction disks 21 attached to the casing, friction disks 22 mounted on the second shaft 5, and a control member 24 supported by the second shaft 5 through a shaft 23. The control member 24 is operable in a braking direction by a displacement of a cam member 70 in contact with a cam 25 on the first shaft 4.

The present invention may be put to practice in various ways, such as with the brake device comprising the drum brake type, with the cam member comprising pins for contacting a cam surface, or with the cam member mounted on a shaft through a ball spline for smooth sliding movement of the cam member.

What is claimed is:

1. A power transmission comprising:

a first shaft acting substantially as a drive shaft;

a second shaft acting substantially as a driven shaft;

a connection provided between said first shaft and said second shaft, said connection including connecting means for interconnecting said first shaft and said second shaft in a way to allow a relative rotational displacement therebetween, and axial displaceable displacing means displaceable with the rotational displacement occurring between said first shaft and said second shaft, said connecting means includes a first cam mounted on said first shaft and having engaging teeth formed on a peripheral surface thereof, and a second cam splined to said second shaft that acts as said displacing means displaceable axially of said second shaft, said second cam having engaging teeth formed on a peripheral surface thereof, said engaging teeth of said first and second cams having contacting surfaces with spacing therebetween variable with a relative circumferential displacement between said cams; and brake means for braking said second shaft in response to the displacement of said displacing means, said brake means includes a brake disk mounted on said second shaft, a pressure plate movable relative to said brake disk, and interlocking means for moving said pressure plate in response to the axial displacement of said second cam, said interlocking means comprises a lever mechanism for amplifying a displacing force from said second cam and transmitting the displacing force to said pressure plate.

2. A power transmission for a vehicle comprising:

a first shaft connected to an engine;

a second shaft connected to a drive wheel; and a connection provided between said first shaft and said second shaft, said connection including:

a drive cam member connected to said first shaft and having a stopper defined to axially project from a circumference thereof and an inclined surface defined to peripherally incline from said stopper;

a driven cam member connected to the second shaft with a projection engageable with said stopper of said drive cam member, said projection being caused to slide peripherally on the inclined surface of the drive cam when said driven cam member rotates at higher speed than said drive cam member whereby said driven cam member is axially displaced;

amplifying means for amplifying an axially displacing force of said driven cam member; and brake means for braking said second shaft by the amplified force by said amplifying means.

3. A power transmission as claimed in claim 2, wherein said brake means includes a brake disk mounted on said second shaft, and a pressure plate axially retractable and extensible relative to said brake disk.

4. A power transmission as claimed in claim 3, wherein said amplifying means comprises a lever mechanism connected to said driven cam member at a first connecting point and connected to said pressure plate at a second connecting point, said lever mechanism including a pivot shaft disposed such that a distance from the pivot shaft to the first connecting point becomes greater than a distance from the pivot shaft to the second connecting point.

5. A power transmission comprising:
a first shaft acting substantially as a drive shaft;
a second shaft acting substantially as a driven shaft; and
a connection provided between said first shaft and second shaft,
said connection including:
first and second connecting means for interconnecting said first shaft and said second shaft in a way to allow a relative rotational displacement therebetween;
a displacing portion axially displaceable in response to the peripheral displacement occurring between said first shaft and said second shaft;
amplifying means for amplifying an axially displacing force of said displacing portion; and
brake means for braking said second shaft by the amplified force by said amplifying means.

6. A power transmission as claimed in claim 5, wherein said first connecting means includes a first cam mounted on said first shaft and having engaging teeth formed on a peripheral surface thereof, and wherein said second connecting means includes a second cam mounted on said second shaft and having engaging teeth formed on a peripheral surface thereof, said engaging teeth of said first and second cams having contacting surfaces with spacing therebetween variable with a relative circumferential displacement between said cams.

7. A power transmission as claimed in claim 6, wherein said brake means includes a brake disk mounted on said second shaft, and a pressure plate axially retractable and extensible relative to said brake disk.

8. A power transmission as claimed in claim 7, wherein said amplifying means comprises a lever mechanism connected to said driven cam member at a first connecting point and connected to said pressure plate at a second connecting point, said lever mechanism including a pivot shaft disposed such that a distance from the pivot shaft to the first connecting point becomes greater than a distance from the pivot shaft to the second connecting point.

* * * * *